US009392093B2

(12) United States Patent
Schillings et al.

(10) Patent No.: US 9,392,093 B2
(45) Date of Patent: Jul. 12, 2016

(54) MULTI-FINGER USER IDENTIFICATION

(71) Applicant: Yahoo! Inc., Sunnyvale, CA (US)

(72) Inventors: Benoit Schillings, Los Altos Hills, CA (US); Daryl Low, San Jose, CA (US); Andreas Rossbacher, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 218 days.

(21) Appl. No.: 13/951,339

(22) Filed: Jul. 25, 2013

(65) Prior Publication Data

US 2015/0033194 A1 Jan. 29, 2015

(51) Int. Cl.
*H04M 1/67* (2006.01)
*G06F 3/01* (2006.01)

(52) U.S. Cl.
CPC ................ *H04M 1/67* (2013.01); *G06F 3/017* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 8,482,381 B2 * | 7/2013 | Chatterjee | G06F 3/016 340/5.52 |
| 8,624,855 B2 * | 1/2014 | Weiss | G06F 3/04883 178/18.01 |
| 8,963,855 B2 * | 2/2015 | Chen | G06F 21/30 178/18.01 |
| 2009/0289911 A1 * | 11/2009 | Nagai | 345/173 |
| 2013/0028488 A1 * | 1/2013 | Abe | 382/115 |
| 2013/0222277 A1 * | 8/2013 | O'Hara | 345/173 |
| 2013/0259324 A1 * | 10/2013 | Huang | G06K 9/00288 382/118 |

* cited by examiner

*Primary Examiner* — Hien Duong
(74) *Attorney, Agent, or Firm* — Martine Penilla Group, LLP

(57) ABSTRACT

A method for identifying a user is provided, including the following method operations: identifying at least three contact regions on a touch sensitive surface, the contact regions defined by simultaneous contact of at least three fingers of the user with the touch sensitive surface; for each contact region, determining a center point; determining distances between each of the determined center points of the contact regions; comparing the determined distances against predefined distances associated with a known user; based on the comparing, determining the user to be the known user or not the known user.

17 Claims, 5 Drawing Sheets

W2
202
CR2
h2
212
(x2, y2)
200
204
D1
D2
210
(x1, y1)
(x3, y3)
h1
h3
210
D3
214
CR1
CR3
W1
W3

MULTI-FINGER USER IDENTIFICATION

BACKGROUND

1. Field of the Invention

The present invention relates to methods for selecting internet content for presentation to a user, and more particularly, methods, systems, and computer programs for adding information sources related to the content of a document.

2. Description of the Related Art

In recent years, mobile devices such as smartphones and tablet computers have undergone massive and widespread adoption by the public. These devices typically include touch-sensitive displays which serve as the primary interface mechanism for users. When powered off, the touchscreen of such devices is inactive. However, because of the potential for the device to be accidentally powered on, devices often include touch-based unlock mechanisms that require the user to perform specific gestures before the full functionality of the device can be accessed by the user.

Examples of such gestures include a swiping gesture or entering a numeric pin on a displayed keypad. However, simple and expedient unlock gestures such as a swiping gesture do not provide security for the device, allowing others to access the device. Whereas, more secure mechanisms such as that requiring a numeric pin are repeatedly tedious for the user and even difficult to apply under certain circumstances, such as when the user is simultaneously engaged in another activity. Thus, there is a need for mechanism to unlock a device that is easy for the user to perform yet also provides security to prevent unwanted users from accessing the device.

It is in this context that embodiments of the invention arise.

SUMMARY

Embodiments of the disclosure provide methods, computer programs, and systems for identifying a user based on multi-finger touch detection.

It should be appreciated that the present embodiments can be implemented in numerous ways, such as a process, an apparatus, a system, a device or a method on a computer readable medium. Several embodiments are described below.

In one embodiment, a method for identifying a user, is provided, including the following method operations: identifying at least three contact regions on a touch sensitive surface, the contact regions defined by simultaneous contact of at least three fingers of the user with the touch sensitive surface; for each contact region, determining a center point; determining distances between each of the determined center points of the contact regions; comparing the determined distances against predefined distances associated with a known user; based on the comparing, determining the user to be the known user or not the known user; wherein the method is executed by a processor.

In one embodiment, the center point for a given contact region is defined by a centroid of the given contact region.

In one embodiment, comparing the determined distances against the predefined distances includes determining a sum of squared differences between each of the determined distances and a corresponding one of the predefined distances.

In one embodiment, the touch sensitive surface is defined on a mobile device; and determining the user to be the known user grants access to a feature of the mobile device for use by the user.

In one embodiment, the method further includes, for each contact region, determining a dimension; comparing the determined dimensions against predefined dimensions associated with the known user; wherein determining the user to be the known user or not the known user is based on the comparing the determined dimensions against the predefined dimensions.

In one embodiment, the dimension is one of a size, a diameter, a radius, a height, a width, a length, or an area.

In one embodiment, the simultaneous contact of the at least three fingers of the user is defined by contact of pads of fingertips of the at least three fingers.

In another embodiment, a device configured to identify a user is provided, including the following: a touch sensitive surface; logic for identifying at least three contact regions on the touch sensitive surface, the contact regions defined by simultaneous contact of at least three fingers of the user with the touch sensitive surface; logic for, for each contact region, determining a center point; logic for determining distances between each of the determined center points of the contact regions; logic for comparing the determined distances against predefined distances associated with a known user; logic for, based on the comparing, determining the user to be the known user or not the known user.

In one embodiment, the center point for a given contact region is defined by a centroid of the given contact region.

In one embodiment, comparing the determined distances against the predefined distances includes determining a sum of squared differences between each of the determined distances and a corresponding one of the predefined distances.

In one embodiment, determining the user to be the known user grants access to a feature of the device for use by the user.

In one embodiment, the device further includes, logic for, for each contact region, determining a dimension; logic for comparing the determined dimensions against predefined dimensions associated with the known user; wherein determining the user to be the known user or not the known user is based on the comparing the determined dimensions against the predefined dimensions.

In one embodiment, the dimension is one of a size, a diameter, a radius, a height, a width, a length, or an area.

In one embodiment, the simultaneous contact of the at least three fingers of the user is defined by contact of pads of fingertips of the at least three fingers.

In another embodiment, a method for identifying a user is provided, including the following method operations: receiving a plurality of touch samples associated with a known user, each touch sample associated with the known user being defined by at least three contact regions of at least three fingers of the known user on a touch sensitive surface; receiving a plurality of touch samples associated with others who are not the known user, each touch sample associated with the others being defined by at least three contact regions corresponding to the at least three contact regions of the known user; determining a discrimination function based on the plurality of touch samples associated with the known user and the plurality of touch samples associated with the others, the discrimination function being defined to classify a given touch sample as from the known user or not from the known user.

In one embodiment, determining the discrimination function includes training a neural network based on the plurality of touch samples associated with the known user and the plurality of touch samples associated with the others.

In one embodiment, each touch sample is defined by parameters of contact regions selected from a centroid, a size, a diameter, a radius, a height, a width, a length, or an area.

In one embodiment, receiving the plurality of touch samples associated with the known user includes presenting an interface on a touchscreen display defining the touch sensitive surface, the interface configured to receive the plurality of touch samples associated with the known user.

In one embodiment, receiving the plurality of touch samples associated with others who are not the known user includes downloading the plurality of touch samples associated with others over a network.

In one embodiment, the method further includes, receiving a touch sample from an unknown user; applying the discrimination function to the touch sample from the unknown user to identify the unknown user as either being the known user or not the known user.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for identifying a user based on multi-finger touch detection. It will be apparent, that the present embodiments may be practiced without some or all of these specific details. In other instances, well known process operations have not been described in detail in order not to unnecessarily obscure the present embodiments.

Figure 1:
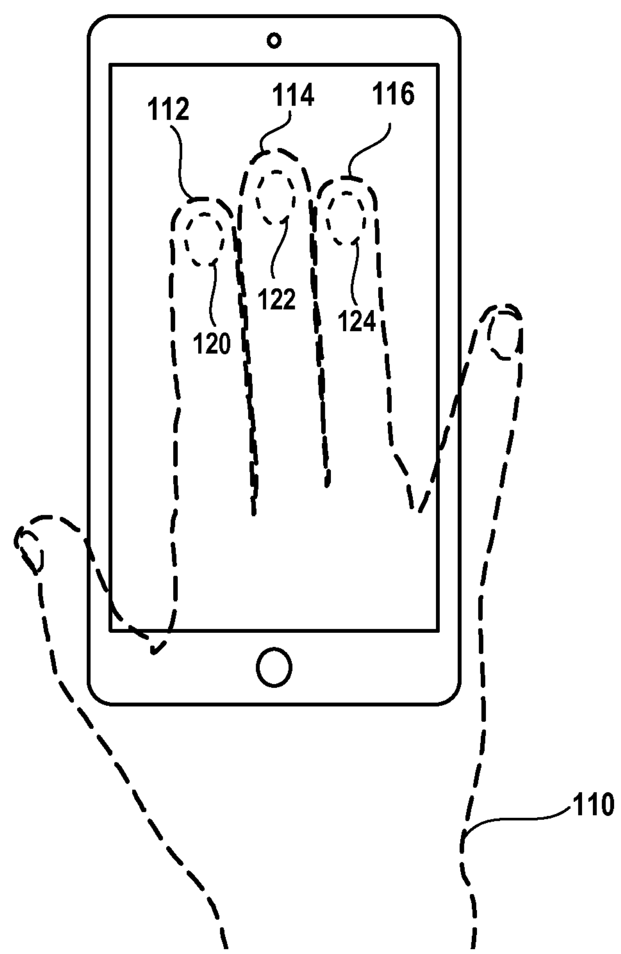
FIG. 1 illustrates a hand of a user touching a mobile device, in accordance with an embodiment of the invention.

FIG. 1 illustrates a hand of a user touching a mobile device, in accordance with an embodiment of the invention. The mobile device 100 includes a touch-sensitive display (or touchscreen) 102 that is capable of sensing contact by the user with the touchscreen. In the illustrated embodiment, a hand 110 of a user is also shown. The tips of three fingers of the user are shown contacting the touch-sensitive display 102. The three fingers are extended and held together so that the contact with the touch sensitive display 102 is achieved in a substantially repeatable manner by the user. That is, the user is able to easily replicate the same or a substantially similar positioning of the fingers relative to each other. More specifically, FIG. 1 shows the fingertips of the index finger 112, middle finger 114, and ring finger 116 contacting the touchscreen 102. The contact with the touchscreen by each of these fingers produces corresponding contact regions 120, 122, and 124, respectively.

It will be appreciated that the configuration of the contact regions will vary from one user to another. In particular, various aspects of each contact region such as its size or shape may vary, and the locations and orientations of the contact regions relative to each other. Therefore, users can be identified on the basis of such contact regions, through receiving touch input and analyzing the contact pattern to determine if it matches a predefined pattern associated with a given user.

Figure 2A:
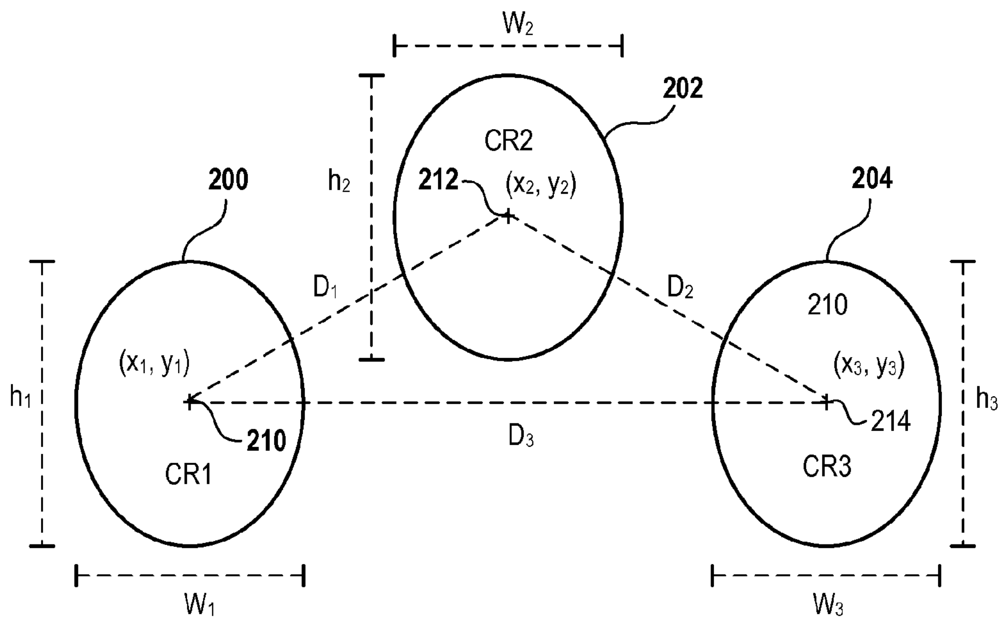
FIG. 2A illustrates a pattern of contact regions from three fingers of a user contacting a touch-sensitive surface, in accordance with an embodiment of the invention.

FIG. 2A illustrates a pattern of contact regions from three fingers of a user contacting a touch-sensitive surface, in accordance with an embodiment of the invention. In the illustrated embodiment, three contact regions 200, 202, and 204 are shown. In some devices, detection of contact with a touch-sensitive surface entails determination of dimensions of the contact, such as height and width, as well as determination of a centroid of the contact region. Thus as shown, the contact region 200 has a height $h_1$, a width $w_1$, and a centroid 210; the contact region 202 has a height $h_2$, a width $w_2$, and a centroid 212; and the contact region 204 has a height $h_3$, a width $w_3$, and a centroid 214. The centroid 210 has coordinates $(x_1, y_1)$; the centroid 212 has coordinates $(x_2, y_2)$, and the centroid 213 has coordinates $(x_3, y_3)$.

A given user will produce contact regions having geometric parameters that are specific to the given user. For example, the aforementioned heights, widths, and centroids of the contact regions, as well as the distances between the centroids, will differ from one user to the next. Therefore, the given user can be identified by receiving contact on a touch-sensitive surface in the specified manner (e.g. fingertips of three fingers extended and held together (as opposed to being spread apart, holding fingers together promotes consistency)), and analyzing geometric parameters of the contact regions. More specifically, the geometric parameters of the received contact regions can be analyzed to determine whether they match a predefined set of geometric parameters associated with a known (or previously identified) user. If a match is determined to exist, then it is determined that the given user touching the touch-sensitive surface is the known user. Whereas if a match is not determined to exist, then it is determined that the given user is not the known user.

It will be appreciated that multiple instances of contact by the same user with the touch-sensitive surface will produce a variance in the geometry of contact regions from one instance of contact to another. Therefore, in accordance with embodiments of the invention, a match between geometric parameters of a current instance of contact and predefined geometric parameters for a known user may be determined to exist if a difference between the geometric parameters is less than a predefined amount. It should be appreciated that the difference between geometric parameters may be determined according to any known methods for mathematically quantifying the difference between such parameters. (For purposes of the present disclosure and for ease of description, the term "difference" shall be understood in a broad sense to encompass any kind of quantitative determination of how one or more parameters are different from other corresponding parameters. A "difference" as such may be defined by or otherwise include a "mathematical difference" which is determined by subtracting one quantity from another.) Calculation of a difference between sets of corresponding parameters may entail calculation of differences between subsets of the corresponding parameters.

Furthermore, it will be appreciated that certain geometric parameters may vary to a greater or lesser extent than other geometric parameters. Therefore, differences between certain ones of the geometric parameters may be weighted to a greater or lesser extent than differences between other ones of the geometric parameters.

Various systems having touch-sensitive surfaces may provide various kinds of information relating to the measurement of contact regions on the touch-sensitive surface. Touch-sensitive surfaces as are known in the art may include capacitive touch sensing surfaces and resistive touch sensing surfaces. Data made available by a given device based on touch detection can range from raw individual sensor data to pre-processed data defining dimensions or other aspects of touch events. For example, in one embodiment, a device may provide location information, and height and width information for a given contact region. With continued reference to FIG. 2A, the location information provided may be defined by coordinates of the centroids 210, 212, and 214 of the contact regions 200, 202, and 204, respectively. And the height and width information may be defined by $h_1$ and $w_1$ for contact region 200, $h_2$ and $w_2$ for contact region 202, and $h_3$ and $w_3$ for contact region 204.

In one embodiment, distances between each of the centroids of the contact regions are determined, for purposes of identifying a user. With reference to FIG. 2A, a distance $D_1$ between centroid 210 and centroid 212 is defined; a distance $D_2$ between centroid 212 and centroid 214 is defined; and a distance $D_3$ between centroid 210 and centroid 214 is defined. Each of these distances can be compared against predefined corresponding distances of a known user to determine if a given user who produces the contact regions 200, 202, and 204 is the known user.

In one embodiment, the distances between the centroids of the received contact regions are compared against the predefined distances of the known user by calculating the sum of the squares of the mathematical differences between the corresponding distances. Thus, by way of example, a given user may be determined to be the known user when the following is true:

$$(D_1-D_a)^2+(D_2-D_b)^2+(D_3-D_c)^2<E$$

wherein $D_a$, $D_b$, and $D_c$ are the corresponding predefined distances associated with the known user, and E is a maximum allowable error.

In another embodiment, the above-described calculation can be extended to include additional parameters, such as the aforementioned heights and widths of the contact regions. Thus, in one embodiment, the given user may be determined to be the known user when the following is true:

$$(D_1-D_a)^2+(D_2-D_b)^2+(D_3-D_c)^2+(h_1-h_a)^2+(h_2-h_b)^2+(h_3-h_c)^2+(W_1-W_a)^2+(w_2-W_b)^2+(w_3-W_c)^2<E$$

wherein $h_a$, $h_b$, and $h_c$ are the corresponding predefined heights associated with the known user, and $w_a$, $w_b$, and $w_c$ are the corresponding predefined widths associated with the known user.

Figure 2B:
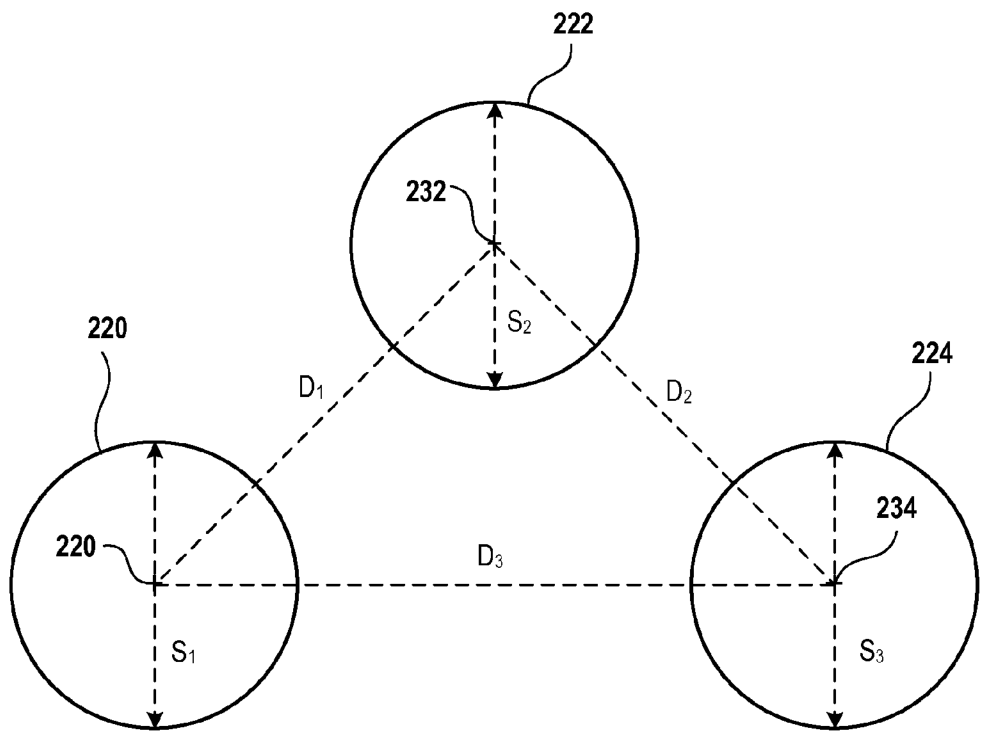
FIG. 2B illustrates several contact regions resulting from contact by the fingertips of three fingers of a user on a touch-sensitive surface, in accordance with an embodiment of the invention.

FIG. 2B illustrates several contact regions resulting from contact by the fingertips of three fingers of a user on a touch-sensitive surface, in accordance with an embodiment of the invention. In some embodiments, each contact region may be defined by a centroid and a size. The size can be defined by any measurement indicative of the size of the contact region, such as a radius, diameter, area, circumference, or other measurement. In the illustrated embodiment, contact region 220 has a centroid 230 and a size $S_1$; contact region 222 has a centroid 232 and a size $S_2$; and contact region 224 has a centroid 234 and a size $S_3$. In one embodiment, a calculation similar to that described above can be utilized to determine whether the contact regions match those of a known user. For example, the given user providing contact regions 220, 222, and 224 may be determined to match a known user if the following is true:

$$(D_1-D_a)^2+(D_2-D_b)^2+(D_3-D_c)^2+(S_1-S_a)^2+(S_2-S_b)^2+(S_3-S_c)^2<E$$

wherein $D_a$, $D_b$, and $D_c$ are the corresponding predefined distances associated with the known user, and $S_a$, $S_b$, and $S_c$ are corresponding predefined sizes associated with the known user, and E is a maximum allowable error.

Figure 3:
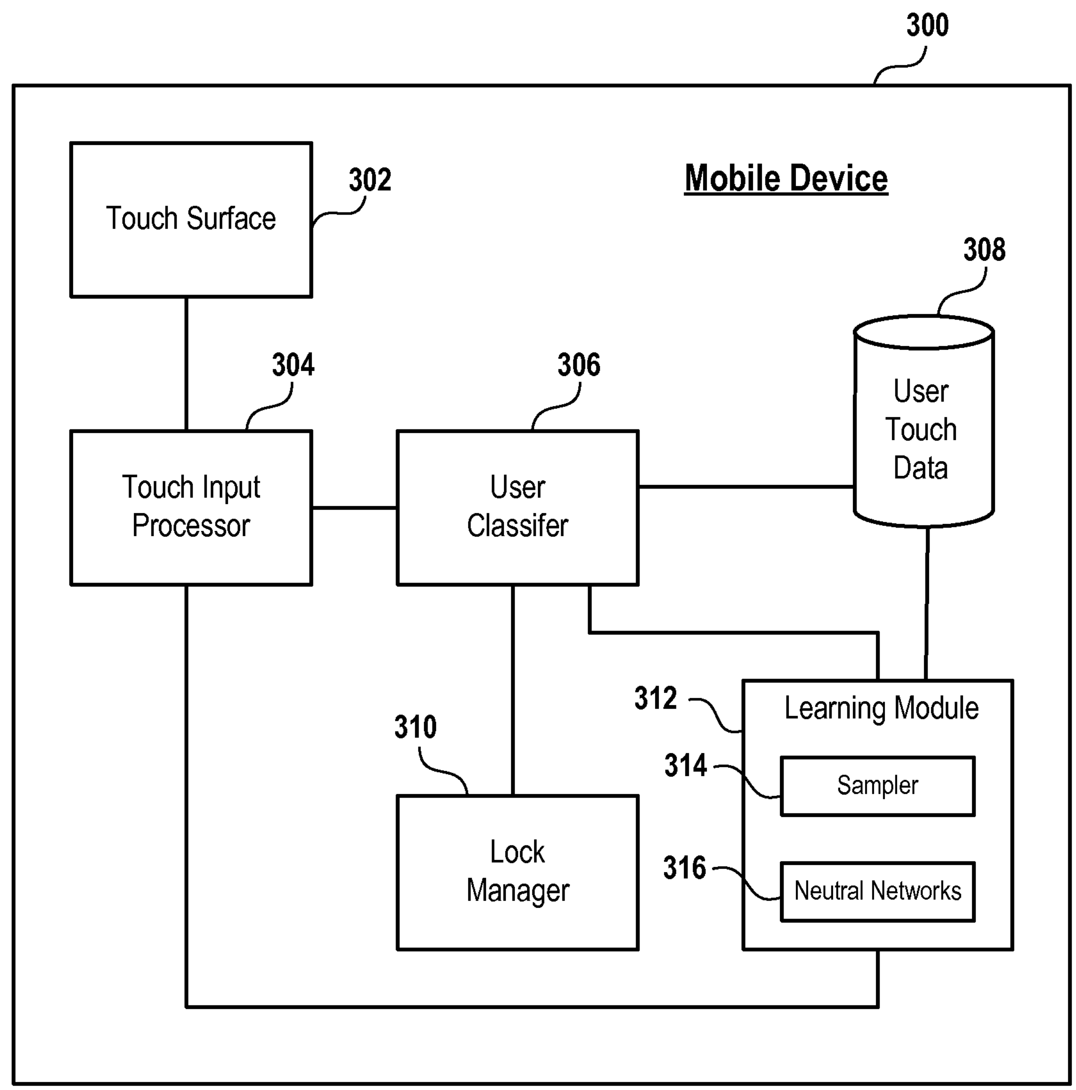
FIG. 3 illustrates a system for identifying a user based on touch input, in accordance with an embodiment of the invention.

FIG. 3 illustrates a system for identifying a user based on touch input, in accordance with an embodiment of the invention. A device 300 is shown to include a touch-sensitive surface 302. The device 300 can be any of various kinds of devices incorporating a touch-sensitive surface, such as a cellular phone, tablet computer, portable media player, mobile device, laptop computer, personal computer, digital camera, portable navigation device, portable gaming device, or any other kind of device having hardware for receiving touch input from a user.

In one embodiment, the touch-sensitive surface 302 may include an array of touch sensors, such as capacitive or resistive touch sensors. A touch input processor 304 processes raw touch input data received from the touch-sensitive surface 302. By way of example, the touch input processor 304 may be configured to identify specific parameters of a contact region when a touch event occurs. In various embodiments, this may include determining a location, centroid, size, height, width, coordinates, or other parameters relating to the contact region. It should be appreciated that multiple contact regions can be processed simultaneously depending upon the capabilities of the touch-sensitive surface 302.

A user classifier 306 is configured to analyze the parameters of contact regions from touch input events and determine whether a given user providing the touch input events is identified as a known user. In one embodiment, this is determined by comparing the parameters of the contact regions from the touch input by the given user with corresponding predefined parameters associated with the known user, to determine whether a sufficient match exists to identify the given user as the known user. The predefined parameters associated with the known user can be stored in a user touch data storage 308. The comparison can be performed in accordance with methods described in the present disclosure, or in accordance with other methods known to those skilled in the art. It will be appreciated that many known methods for comparing quantitative values can be applied, consistent with the embodiments of the invention described herein.

In one embodiment, the user classifier 306 may determine whether the given user is a known user or not the known user. In another embodiment, the user classifier 306 may be configured to determine whether the given user can be identified as one of a plurality of known users, or as not being any of the plurality of known users. In such an embodiment, the user touch data 308 can be configured to include predefined touch parameters associated with each of the plurality of users, to be utilized for comparison purposes as described herein to identify a given user.

The device 300 further includes a lock manager 310 that communicates with the user classifier 306. The lock manager 310 is configured to manage the locking and unlocking of the device 300 for use by the given user. For example, if the given user is identified as a known authorized user of the device 300 by the user classifier 306, then the lock manager 310 may unlock the device for user by the given user. Whereas, if the given user is not identified as a known authorized user of the device 300 by the user classifier 306, then the lock manager 310 will not unlock device. In one embodiment, if a predefined number of successive attempts (e.g. within a limited time span) to unlock the device via touch inputs are unsuccessful, the lock manager 310 can be configured to request a different form of input, such as a numerical pin, an answer to a security question, etc.

Figure 4:
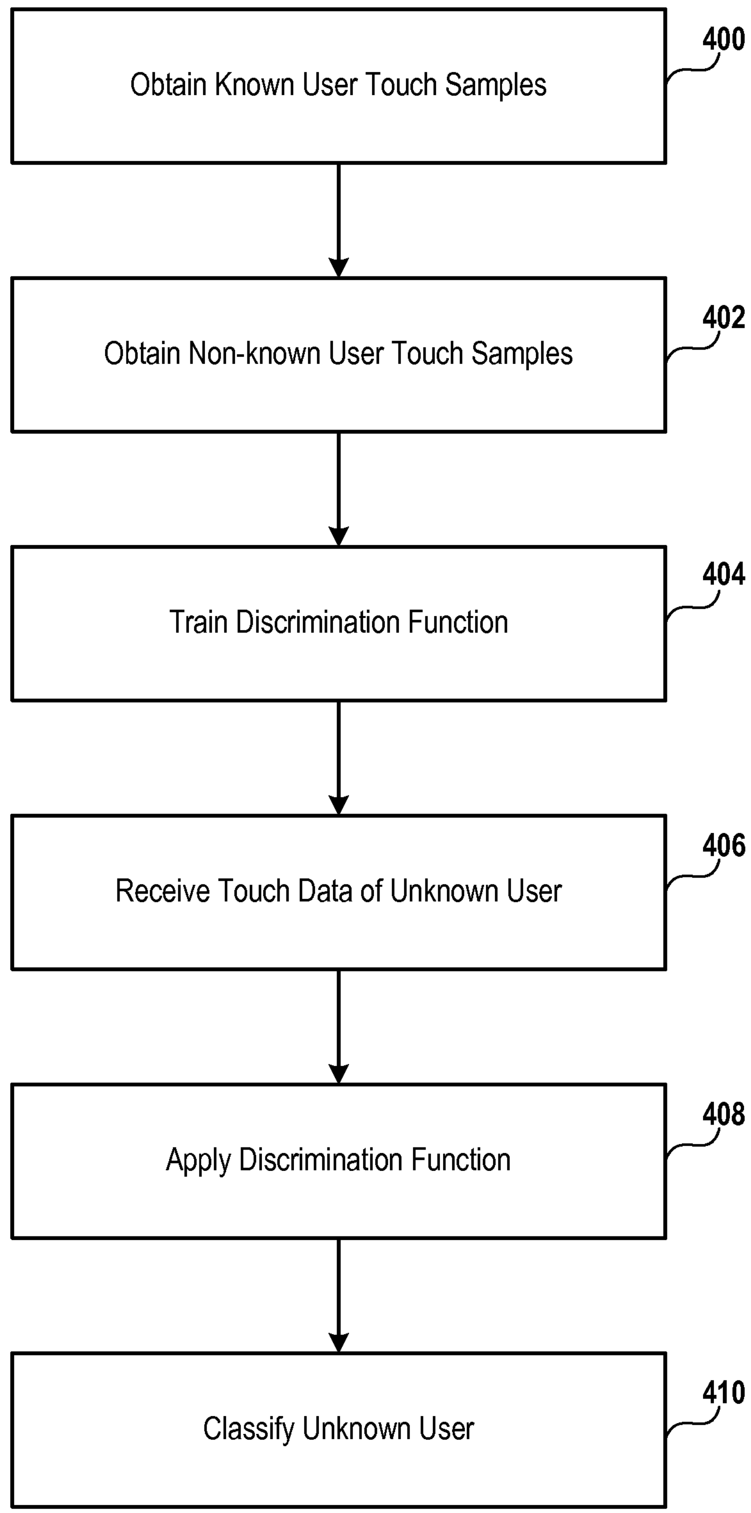
FIG. 4 illustrates a method for identifying a user, in accordance with an embodiment of the invention.

FIG. 4 illustrates a method for identifying a user, in accordance with an embodiment of the invention. At method operation 400, a plurality of touch samples of a known user are obtained. This can be performed by receiving repeated touch input at a touch-sensitive surface from the known user in a specified manner. For example, the known user can be instructed to maneuver the middle three fingers of one of their hands so as to be held together (index and middle fingers touching each other, and middle and ring fingers touching each other) while each finger is extended, and to simultaneously touch the pads of the fingertips of these three fingers to the touch-sensitive surface. A plurality of touch samples are obtained in this manner, which may provide for the variance in touch samples from the known user. Each touch sample is defined by parameters of the three contact regions resulting from contact with the touch-sensitive surface in the prescribed manner.

At method operation 402, a plurality of touch samples are obtained from other users who are not the known user. It should be appreciated that each touch sample defines corresponding parameters of contact regions for a different user from the known user. In one embodiment, the touch samples of other users can be obtained by accessing a predefined library of touch samples. In another embodiment, the touch samples of other users can be obtained by having other users provide touch input to the touch-sensitive surface.

At method operation 404, a discrimination function is trained based on the touch samples of the known user, and the touch samples of the other users. The discrimination function is defined and optimized to discriminate between the known user and the other users on the basis of touch input in the prescribed manner. In other words, when a touch sample of an unknown user is presented, the discrimination function can be utilized to determine whether the unknown user is the known user or is not the known user. Various methods known in the art can be utilized to define and train the discrimination function on the basis of the touch samples. In various embodiments, machine learning methods can be applied to determine the discrimination function. In one embodiment, a neural network can be trained One example of a machine learning algorithm is the Adaptive Boosting (AdaBoost) machine learning algorithm. These and other methods for machine learning can be applied for purposes of the present disclosure.

At operation 406, touch data of an unknown user is received. At operation 408, the discrimination function is applied to the touch data of the unknown user. And at operation 410, the unknown user is classified as being either the known user or not the known user.

Additionally, in one embodiment, verified instances of touch input received from the known user can be added to the touch samples of the known user, and therefore the discrimination function can be refined over time based on the enlarged sampling of touch inputs from the known user. In one embodiment, when a touch input event is identified as from the known user, an option can be presented to add the touch input event parameters as a new touch sample to the already existing touch samples associated with the known user. The discrimination function can then be retrained based on the enlarged library of touch samples. In one embodiment, the discrimination function is trained based on a selected group of touch samples associated with the known user, e.g. a predefined number of the most recent touch samples, touch samples occurring within a specified time period (e.g. not older than a predefined length of time), etc.

In the foregoing embodiment, the discrimination function is defined to discriminate between a single user and any other user. However, in other embodiments, the discrimination function can be defined to discriminate between a plurality of users and any other users who are not one of the plurality of users.

Though embodiments of the disclosure have been described with reference to geometric parameters of contact regions, in other embodiments, temporal aspects can be considered. For example, in one embodiment, a length of time that a given contact region is maintained can be considered as a parameter for the contact region. Hence, the length of time of a contact region from a given user can be determined and compared against a predefined length of time associated with a known user. The comparison can be utilized to, at least in part, determine whether the given user can be identified as the known user.

With continued reference to FIG. 3, the device 300 can be further configured to include a learning module 312. The learning module 312 is configured to determine a discrimination function in accordance with the methods described herein. The learning module 312 includes a sampler 314 configured to obtain touch samples from a known user and touch samples from others who are known to not be the known user. In one embodiment, the learning module 312 defines a neural network 316 that is trained based on the touch samples to define and optimize the discrimination function. The discrimination function thus defined is applied by the user classifier 306 to determine whether a given user is a known user based on the given user's touch input.

Figure 5:
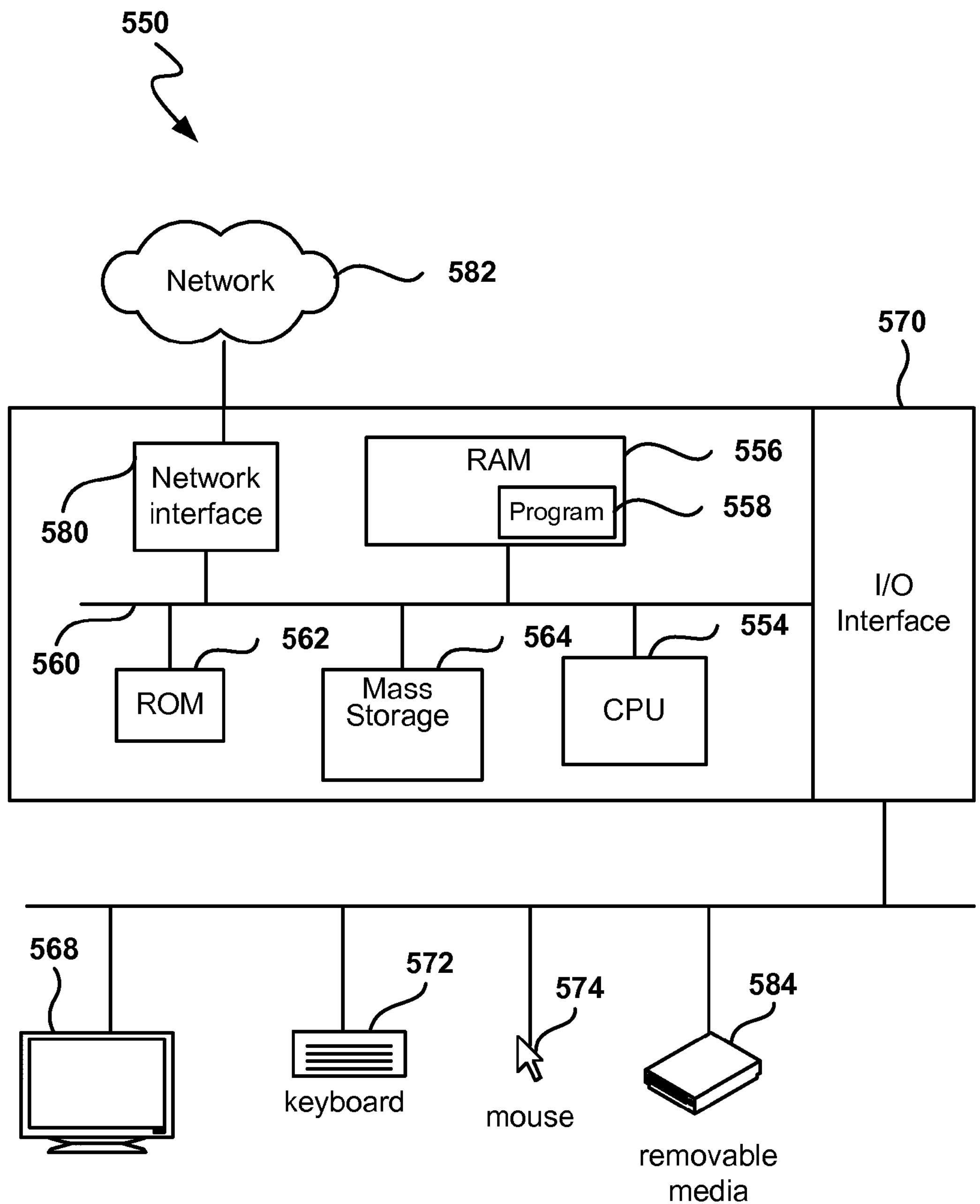
FIG. 5 is a simplified schematic diagram of a computer system for implementing embodiments of the present disclosure.

FIG. 5 is a simplified schematic diagram of a computer system for implementing embodiments of the present disclosure. The various components of the computer system can be integrated in a single device, or can define separate devices which are connected to each other. FIG. 5 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 554, which is coupled through bus 560 to random access memory (RAM) 556, read-only memory (ROM) 562, and mass storage device 564. A computer program 558 for implementing embodiments of the present disclosure can reside in random access memory (RAM) 556, but can also reside in mass storage 564.

Mass storage device 564 represents a persistent data storage device such as a floppy disc drive, fixed disc drive, or solid-state drive, which may be local or remote. Network interface 580 provides connections via network 582, allowing communications with other devices. It should be appreciated that CPU 554 may be embodied in a general-purpose processor, a special purpose processor, or a specially programmed logic device. Input/Output (I/O) interface provides communication with different peripherals and is connected with CPU 554, RAM 556, ROM 562, and mass storage device 564, through bus 560. Sample peripherals include display 568, keyboard 572, cursor control 574, removable media device 584, etc.

Display 568 is configured to display the user interfaces described herein. Keyboard 572, cursor control 574, removable media device 584, and other peripherals are coupled to I/O interface 570 in order to communicate information and command selections to CPU 554. It should be appreciated that data to and from external devices may be communicated through I/O interface 570. The embodiments can also be practiced in distributed computing environments where tasks are performed by remote processing devices that are linked through a wire-based or wireless network.

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for identifying a user, comprising:

identifying at least three contact regions on a touch sensitive surface, the contact regions defined by simultaneous contact of at least three fingers of the user with the touch sensitive surface;

for each contact region, determining a center point;

determining distances between each of the determined center points of the contact regions;

comparing the determined distances against predefined distances associated with a known user, wherein comparing the determined distances against the predefined distances includes determining a sum of squared differences between each of the determined distances and a corresponding one of the predefined distances;

based on the comparing, determining the user to be the known user or not the known user;

wherein comparing the determined distances against the predefined distances includes determining whether the sum of squared differences is less than a maximum allowable error, wherein the user is determined to be the known user if the sum of squared differences is less than the maximum allowable error, and wherein the user is determined to be not the known user if the sum of squared differences is greater than the maximum allowable error;

wherein the method is executed by a processor.

2. The method of claim 1, wherein the center point for a given contact region is defined by a centroid of the given contact region.

3. The method of claim 1, wherein the touch sensitive surface is defined on a mobile device; and wherein determining the user to be the known user grants access to a feature of the mobile device for use by the user.

4. The method of claim 1, further comprising, for each contact region, determining a dimension;

comparing the determined dimensions against predefined dimensions associated with the known user;

wherein determining the user to be the known user or not the known user is based on the comparing the determined dimensions against the predefined dimensions.

5. The method of claim 4, wherein the dimension is one of a size, a diameter, a radius, a height, a width, a length, or an area.

6. The method of claim 1, wherein the simultaneous contact of the at least three fingers of the user is defined by contact of pads of fingertips of the at least three fingers.

7. The method of claim 1, wherein the predefined distances are determined from a plurality of touch samples associated with the known user.

8. The method of claim 7, wherein when the user is determined to be the known user, then the determined distances are added to the plurality of touch samples associated with the known user, and the predefined distances associated with the known user are updated.

9. A device configured to identify a user, comprising:

a touch sensitive surface;

logic for identifying at least three contact regions on the touch sensitive surface, the contact regions defined by simultaneous contact of at least three fingers of the user with the touch sensitive surface;

logic for, for each contact region, determining a center point;

logic for determining distances between each of the determined center points of the contact regions;

logic for comparing the determined distances against predefined distances associated with a known user, wherein comparing the determined distances against the predefined distances includes determining a sum of squared differences between each of the determined distances and a corresponding one of the predefined distances;

logic for, based on the comparing, determining the user to be the known user or not the known user;

wherein comparing the determined distances against the predefined distances includes determining whether the sum of squared differences is less than a maximum allowable error, wherein the user is determined to be the known user if the sum of squared differences is less than the maximum allowable error, and wherein the user is determined to be not the known user if the sum of squared differences is greater than the maximum allowable error.

10. The device of claim 9, wherein the center point for a given contact region is defined by a centroid of the given contact region.

11. The device of claim 9, wherein determining the user to be the known user grants access to a feature of the device for use by the user.

12. The device of claim 9, wherein the further comprising, logic for, for each contact region, determining a dimension;

logic for comparing the determined dimensions against predefined dimensions associated with the known user;

wherein determining the user to be the known user or not the known user is based on the comparing the determined dimensions against the predefined dimensions.

13. The device of claim 12, wherein the dimension is one of a size, a diameter, a radius, a height, a width, a length, or an area.

14. The device of claim 9, wherein the simultaneous contact of the at least three fingers of the user is defined by contact of pads of fingertips of the at least three fingers.

15. A method for identifying a user, comprising:

identifying at least three contact regions on a touch sensitive surface defined on a mobile device, the contact regions defined by simultaneous contact of at least three fingers of the user with the touch sensitive surface;

for each contact region, determining a center point;

determining distances between each of the determined center points of the contact regions, wherein the center point for a given contact region is defined by a centroid of the given contact region;

comparing the determined distances against predefined distances associated with a known user, wherein comparing the determined distances against the predefined distances includes determining a sum of squared differences between each of the determined distances and a corresponding one of the predefined distances, and determining whether the sum of squared differences is less than a maximum allowable error;

based on the comparing, determining the user to be the known user or not the known user, wherein the user is determined to be the known user if the sum of squared differences is less than the maximum allowable error, wherein determining the user to be the known user unlocks the mobile device for use by the user, and wherein the user is determined to be not the known user if the sum of squared differences is greater than the maximum allowable error, wherein determining the user to be not the known user does not unlock the mobile device;

wherein the method is executed by a processor.

16. The method of claim 15, further comprising, for each contact region, determining a dimension, the dimension being one of a size, a diameter, a radius, a height, a width, a length, or an area;

comparing the determined dimensions against predefined dimensions associated with the known user;

determining squared differences between the determined dimensions and predefined dimensions associated with the known user;

wherein the sum of squared differences further includes the squared differences between the determined dimensions and predefined dimensions associated with the known user.

17. The method of claim 15, wherein the predefined distances are determined from a plurality of touch samples associated with the known user, and wherein when the user is determined to be the known user, then the determined distances are added to the plurality of touch samples associated with the known user, and the predefined distances associated with the known user are updated.

* * * * *